(12) United States Patent
González

(10) Patent No.: US 9,230,218 B2
(45) Date of Patent: Jan. 5, 2016

(54) SYSTEMS AND METHODS FOR RECOGNIZING AMBIGUITY IN METADATA

(71) Applicant: Spotify AB, Stockholm (SE)

(72) Inventor: Alejandro Machado González, Pontevedra (ES)

(73) Assignee: SPOTIFY AB, Stockholm (SE)

( * ) Notice: Subject to any disclaimer, the term of this patent is extended or adjusted under 35 U.S.C. 154(b) by 364 days.

(21) Appl. No.: 13/913,195

(22) Filed: Jun. 7, 2013

(65) Prior Publication Data

US 2013/0332400 A1 Dec. 12, 2013

Related U.S. Application Data

(60) Provisional application No. 61/657,678, filed on Jun. 8, 2012.

(51) Int. Cl.
*G06N 5/04* (2006.01)
*G06F 17/30* (2006.01)

(52) U.S. Cl.
CPC .......... *G06N 5/048* (2013.01); *G06F 17/30752* (2013.01)

(58) Field of Classification Search
CPC ..................................................... G06N 5/048
USPC ........................................................ 706/14
See application file for complete search history.

(56) References Cited

PUBLICATIONS

Xue, Comment on "On Discriminative vs. Generative Classifiers: A Comparison of Logistic Regression and Naive Bayes", Kluwer Academic Publishers, Oct. 26, 2008, 33 pgs.

Embley, Attribute Match Discovery in Information Integration: Exploiting Multiple Facets of Metadata, www.scielo.br/pdf/jbcos/v8n2/a04v8n2.pdf, Jan. 1, 2002; pp. 32-43.
Ilan, Two Supervised Learning Approaches for Name Disambiguation in Author Citations, JCDL '04, Tucson, AZ, Jun. 7-11, 2004, pp. 296-305.
Kern, Model Selection Strategies for Author Disambiguation, 22nd International Workshop on Database and Expert Systems Applications (DEXA), Aug. 29, 2011, pp. 155-159.
Spotify AB, International Search Report and Written Opinion, PCT/US2013/044831, Aug. 7, 2013, 10 pgs.
Sun, Detecting Ambiguous Author Names in Crowdsourced Scholarly Data, 3rd Socialcom, Oct. 9, 2011, pp. 568-571.
Spotify AB, International Preliminary Report on Patentability, PCT/US2013/044831, Dec. 9, 2014, 8 pgs.

*Primary Examiner* — David Vincent
*Assistant Examiner* — Ola Olude Afolabi
(74) *Attorney, Agent, or Firm* — Morgan, Lewis & Bockius LLP

(57) ABSTRACT

A method for estimating artist ambiguity in a dataset is performed at a device with a processor and memory storing instructions for execution by the processor. The method includes applying a statistical classifier to a first dataset including a plurality of media items, wherein each media item is associated with one of a plurality of artist identifiers, each artist identifier identifies a real world artist, and the statistical classifier calculates a respective probability that each respective artist identifier is associated with media items from two or more different real world artists based on a respective feature vector corresponding to the respective artist identifier. The method further includes providing a report of the first dataset, including the calculated probabilities, to a user of the electronic device. Each respective feature vector includes a plurality of features that indicate likelihood of artist ambiguity.

22 Claims, 7 Drawing Sheets

502

Artist Identifier: {Prince} — 504

506 — Item 1
   Artist Name: Prince
   Title: Raspberry Beret
   Country Code: US
   Record Label: Paisley Park 508 — Item 2
   Artist Name: Prince
   Title: Little Red Corvette
   Country Code: US
   Record Label: Warner Bros.

510 — Item 3
   Artist Name: Prince
   Title: Missing You
   Country Code: JM
   Record Label: CD Baby

$$x = \begin{bmatrix} x_1 \\ x_2 \\ x_3 \\ x_4 \\ x_5 \end{bmatrix} = \begin{bmatrix} \textit{Artist Match} \\ \textit{Country Count} \\ \textit{Name Length} \\ \textit{Label Count} \\ \textit{Multilingual} \end{bmatrix} = \underbrace{\begin{bmatrix} 1 \\ 1 \\ 1 \\ 1 \\ 0 \end{bmatrix}}_{513}$$

Figure 5B

SYSTEMS AND METHODS FOR RECOGNIZING AMBIGUITY IN METADATA

RELATED APPLICATION

This application claims priority and benefit of U.S. provisional patent application Ser. No. 61/657,678, entitled "Systems and Methods for Recognizing Ambiguity in Metadata," filed Jun. 8, 2012, which is incorporated by reference in its entirety.

TECHNICAL FIELD

The disclosed implementations relate generally to recognizing ambiguity in metadata, and more specifically, to recognizing when an artist identifier is mistakenly associated with multiple artists of the same name.

BACKGROUND

Modern media content providers offer streaming and/or downloadable media from a large content catalog. Indeed, streaming music services may offer access to millions of songs. In order to provide the best service to their customers, content providers offer many different ways for users to search for and identify content to consume. For example, in the context of a streaming music provider, users are able to search for individual tracks or albums, or to search by artist.

For both the content providers and consumers, it is convenient to associate each content item with a unique artist identifier, so that tracks by a particular artist can be quickly and easily located. Typically, it is sufficient to apply the same unique artist identifier to all tracks associated with the same "artist name" (which is a common metadata field for music tracks). Sometimes, though, different artists have the same name, which can lead to tracks from multiple artists being associated with the same artist identifier in the content catalog. This can make it difficult for users to locate certain tracks or certain artists, and can reduce the visibility of real-world artists who should be separately identified. For example, the name "Prince" is associated with both the well-known U.S.-based pop musician and a lesser known Caribbean artist. Unless such ambiguities are recognized and the catalog is corrected to associate different real-world artists with different unique artist identifiers, ambiguous artist identifiers will continue to plague search results, leading to user confusion and a generally poor user experience.

Given the large number of artists in the database, though, it is not feasible to manually review every artist identifier to ensure that it is not ambiguous (i.e., associated with content items from a multiple different real-world artists). Accordingly, there is a need to provide ways to detect artist ambiguity in a large content catalog.

SUMMARY

The implementations described herein use statistical methods to determine a likelihood that an artist identifier in a content provider's system is mistakenly associated with content items from multiple real-world artists.

In some implementations, a statistical classifier uses feature vectors to determine whether an artist identifier is likely to be ambiguous. Feature vectors are composed of features that describe or are derived from various aspects of the tracks, albums, or other metadata associated with the artist identifier that are potential indicators of ambiguity. For example, shorter artist names are more likely to be ambiguous than longer names. As another example, an artist identifier associated with albums in two or more different languages can indicate that the artist is likely ambiguous (e.g., because artists are likely to release their albums in the same language). These features, as well as others described herein, are used to populate a feature vector for the artist identifiers in a database. The statistical classifiers then determine, based on the feature vectors, whether individual ones of the artist identifiers are likely to be ambiguous.

Various statistical classifiers are used in various implementations, as described herein. For example, a logistic regression classifier is used in some instances, while a naïve Bayes classifier is used in others. These classifiers are discussed in greater detail herein.

Once the classifiers have determined that an artist identifier is likely ambiguous, the artist identifier can be flagged or otherwise marked for manual review by a human operator to confirm whether the artist is, in fact, ambiguous. The human operator may also identify which content items belong to which artist, and assign different artist identifiers to each real-world artist. In some cases, automated or semi-automated means may be used instead of manual review to perform these tasks. For example, a content provider will consult a supplemental database that is known to have unambiguous information and correct the ambiguity based on the information in the supplemental database (e.g., by creating new artist identifiers and re-associating content items with the correct identifier).

EXEMPLARY IMPLEMENTATIONS

A method for estimating artist ambiguity in a dataset is performed at an electronic device having one or more processors and memory storing one or more programs for execution by the one or more processors. The method includes applying a statistical classifier to a first dataset including a plurality of media items, wherein each media item is associated with one of a plurality of artist identifiers, each artist identifier identifies a real world artist, and the statistical classifier calculates a respective probability that each respective artist identifier is associated with media items from two or more different real world artists based on a respective feature vector corresponding to the respective artist identifier.

Each respective feature vector includes features selected from the group consisting of: whether the corresponding respective artist identifier matches multiple artist entries in one or more second datasets; whether a respective number of countries of registration of media items associated with the corresponding respective artist identifier exceeds a predetermined country threshold; whether a respective number of characters in the corresponding respective artist identifier exceeds a predetermined character threshold; whether a respective number of record labels associated with the corresponding respective artist identifier exceeds a predetermined label threshold; whether the corresponding respective artist identifier is associated with albums in at least two different languages; and whether a difference between an earliest release date and a latest release date of media items associated with the corresponding respective artist identifier exceeds a predetermined time span threshold.

In some implementations, each respective feature vector includes features selected from the group consisting of: whether the corresponding respective artist identifier matches multiple artist entries in one or more second datasets; a respective number of countries of registration of media items associated with the corresponding respective artist identifier; a respective number of characters in the corresponding respective artist identifier; a respective number of record labels associated with the corresponding respective artist identifier; a respective number of languages of albums associated with the corresponding respective artist identifier; and a respective difference between an earliest release date and a latest release date of media items associated with the corresponding respective artist identifier.

In some implementations, the statistical classifier is a naïve Bayes classifier. In some implementations, the feature vector used by the naïve Bayes classifier includes the following features: whether the corresponding respective artist identifier matches multiple artist entries in one or more second datasets; whether a respective number of characters in the corresponding respective artist identifier exceeds a predetermined character threshold; and whether the corresponding respective artist identifier is associated with albums in at least two different languages.

In some implementations, the statistical classifier is a logistic regression classifier. In some implementations, the feature vector used by the logistic regression classifier includes the following features: whether the corresponding respective artist identifier matches multiple artist entries in one or more second datasets; whether a respective number of countries of registration of media items associated with the corresponding respective artist identifier exceeds a predetermined country threshold; whether a respective number of characters in the corresponding respective artist identifier exceeds a predetermined character threshold; and whether the corresponding respective artist identifier is associated with albums in at least two different languages.

In some implementations, the method includes providing a report of the first dataset, including the calculated probabilities, to a user of the electronic device.

In some implementations, the method includes determining whether each respective probability satisfies a predetermined probability condition; and setting a flag for each respective artist identifier that satisfies the predetermined probability condition. In some implementations, the predetermined probability condition is whether the respective probability exceeds a predetermined probability threshold. In some implementations, the probability threshold is 0.5, 0.9, or any other appropriate value.

In some implementations, the method includes determining whether the respective probabilities of the respective artist identifiers satisfy a predetermined probability condition; and in response to detecting that a particular probability of a particular artist identifier satisfies the predetermined probability condition: creating a new artist identifier; and associating one or more particular media items with the new artist identifier, wherein the one or more particular media items were previously associated with the particular artist identifier.

In some implementations, the method further includes, prior to creating the new artist identifier, identifying the one or more media items in a second dataset by identifying a first artist entry in the second dataset that is associated with the one or more media items and has a same artist name as the particular artist identifier, and identifying a second artist entry in the second dataset that is not associated with the one or more media items and has the same name as the particular artist identifier.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods described above.

In accordance with some implementations, an electronic device is provided that comprises means for performing any of the methods described above.

In accordance with some implementations, an electronic device is provided that comprises a processing unit configured to perform any of the methods described above.

In accordance with some implementations, an electronic device is provided that comprises one or more processors and memory storing one or more programs for execution by the one or more processors, the one or more programs including instructions for performing any of the methods described above.

In accordance with some implementations, an information processing apparatus for use in an electronic device is provided, the information processing apparatus comprising means for performing any of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 5A is an illustration of a metadata entry, in accordance with some implementations.

FIG. 5B is an illustration of a feature vector, in accordance with some implementations.

DETAILED DESCRIPTION

Figure 1:
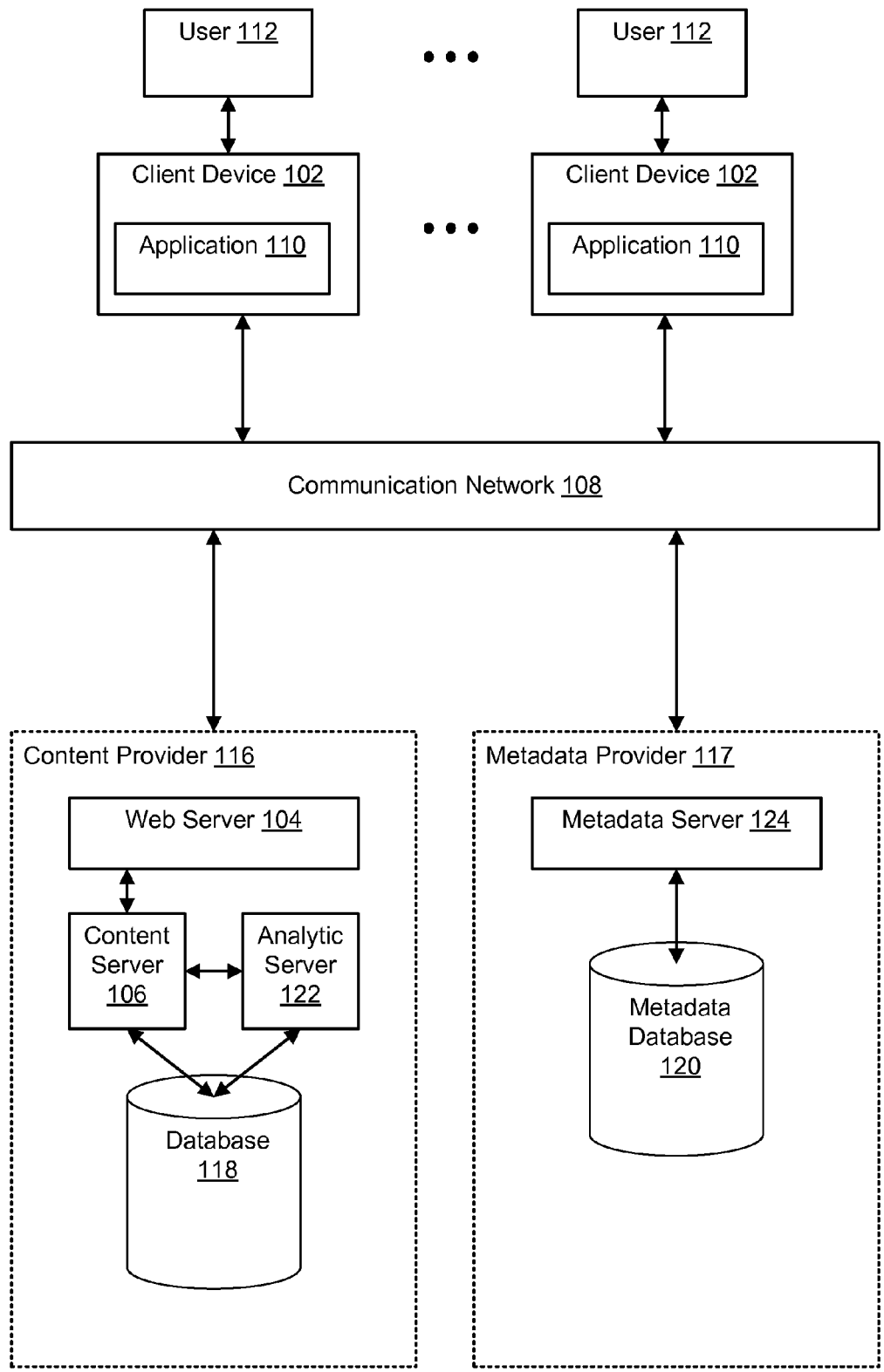
FIG. 1 is an illustration of a client-server environment, according to some implementations.

FIG. 1 illustrates the context in which some implementations of the present invention operate. A plurality of users 112 access their client devices 102 to run an application 110, which accesses content items provided by the content provider 116. In some implementations, the application 110 runs within a web browser 224. The application 110 communicates with the content provider 116 over a communication network 108, which may include the Internet, other wide areas networks, one or more local networks, metropolitan networks, or combinations of these. The content provider 116 works with the application 110 to provide users with content items, such as audio tracks or videos. The content provider 116 typically has one or more web servers 104, which receive requests from client devices 102, and provide content items, web pages, or other resources in response to those requests. The content provider also includes one or more content servers 106, which select appropriate content items for users. The data used by the content servers 106 is typically stored in a database 118, including content items 324 and associated metadata, as described below with respect to FIG. 3. In some implementations, the database 118 is stored at one or more of the content servers 106. In some implementations, the database is a relational SQL database. In other implementations, the data is stored as files in a file system or other non-relational database management system The client device 102 includes an application 110, such as a media player that is capable of receiving and displaying/playing back audio, video, images, and the like. The client device 102 is any device or system that is capable of storing and presenting content items to a user. For example, the client device 102 can be a laptop computer, desktop computer, handheld or tablet computer, mobile phone, digital media player, portable digital assistant, television, etc. Moreover, the client device 102 can be part of, or used in conjunction with, another electronic device, such as a set-top-box, a stereo or home-audio receiver, a speaker dock, a television, a digital photo frame, a projector, a smart refrigerator, a "smart" table, or a media player accessory.

In some implementations, the client device 102, or an application 110 running on the client device 102, requests web pages or other content from the web server 104. The web server 104, in turn, provides the requested content to the client device 102.

The content items 324 stored in the database 118 include audio tracks, images, videos, etc., which are sent to client devices 102 for access by users 112. For example, in implementations where the application 110 is a media player, the application 110 may request media content items, and the content provider 116 sends the requested media content items to the client device 102.

An analytic server 122 performs statistical analyses on the information in the database 118 to identify artist identifiers that are likely to be ambiguous (e.g., associated with media content from multiple real-world artists), as described herein. In some implementations, based on the statistical analyses, the analytic server 122 provides reports identifying those artist identifiers that may be ambiguous, so that they can be reviewed and corrected (manually or automatically, e.g., by the analytic server 122).

A metadata server 124 is associated with a metadata provider 117, which provides curated metadata for media content (e.g., from the metadata database 120). Metadata from the metadata provider 117 can be used by the service provider 116 to help identify and/or correct ambiguous artist identifiers. In some implementations, the service provider 116 uses multiple metadata providers 117 and/or metadata servers 124 to identify and/or correct ambiguous artist identifiers, as discussed below.

Figure 2:
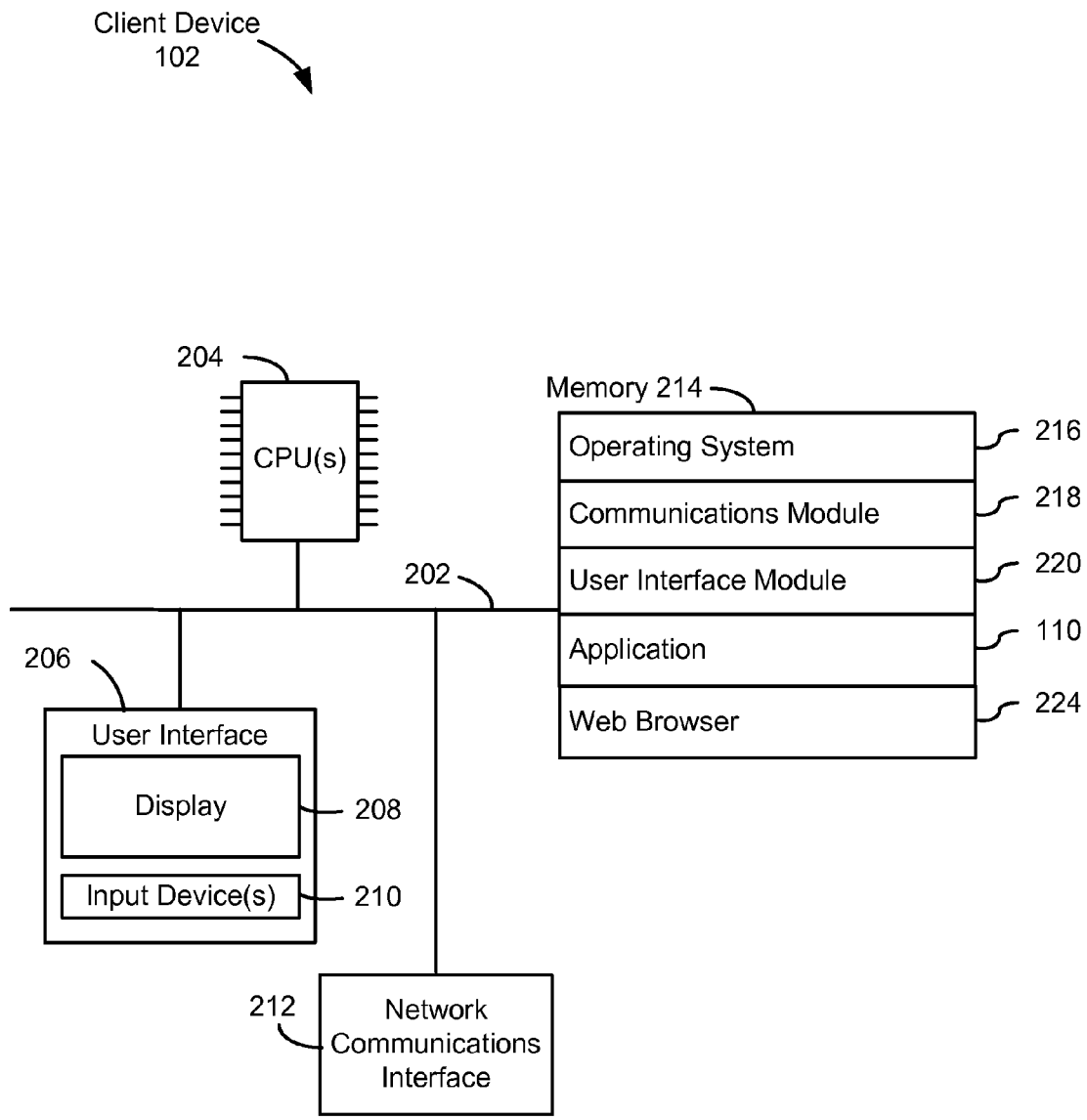
FIG. 2 is a block diagram illustrating a client device, in accordance with some implementations.

FIG. 2 is a block diagram illustrating a client device 102, according to some implementations. The client device 102 typically includes one or more processing units (CPUs, sometimes called processors or cores) 204 for executing programs (e.g., programs stored in memory 214), one or more network or other communications interfaces 212, user interface components 206, memory 214, and one or more communication buses 202 for interconnecting these components. The communication buses 202 may include circuitry (sometimes called a chipset) that interconnects and controls communications between system components. In some implementations, the user interface 206 includes a display 208 and input device(s) 210 (e.g., keyboard, mouse, touchscreen, keypads, etc.). In some implementations, the client device 102 is any device or system that is capable of storing and presenting content items to a user. In some implementations, the client device 102 is a mobile device, including, but not limited to, a mobile telephone, audio player, laptop computer, handheld or tablet computer, digital media player, portable digital assistant, or the like. In some implementations, the client device 102 is a desktop (i.e., stationary) computer. In some implementations, the client device is, or is incorporated into, a set-top-box, a stereo or home-audio receiver, a speaker dock, a television, a digital photo frame, a projector, a smart refrigerator, a "smart" table, or a media player accessory.

Memory 214 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 214 optionally includes one or more storage devices remotely located from the CPU(s) 204. Memory 214, or alternately the non-volatile memory devices(s) within memory 214, comprises a non-transitory computer readable storage medium. In some implementations, memory 214 or the computer readable storage medium of memory 214 stores the following programs, modules, and data structures, or a subset thereof:

- an operating system 216, which includes procedures for handling various basic system services and for performing hardware dependent tasks;
- a communications module 218, which connects the client device 102 to other computers (e.g., the web server 104, the content server 106, etc.) via the one or more communication interfaces 212 (wired or wireless) and one or more communication networks 108, such as the Internet, other wide area networks, local area networks, metropolitan area networks, and so on;
- a user interface module 220, which receives commands from the user via the input device(s) 210 and generates user interface objects in the display device 208;
- an application 110 (e.g., a media player, a game, etc.), which provides one or more computer-based functions to a user; and
- a web browser 224, which allows a user to access web pages and other resources over the web. In some implementations, the application 110 runs within the web browser 224.

The application 110 is any program or software that provides one or more computer-based functions to a user. In some implementations, the application is a media player. In some implementations, the application is a computer game. The application 110 may communicate with the web server 104, the content server 106, as well as other computers, servers, and systems.

In some implementations, the programs or modules identified above correspond to sets of instructions for performing a function or method described herein. The sets of instructions can be executed by one or more processors or cores (e.g., the CPUs 204). The above identified modules or programs (i.e., sets of instructions) need not be implemented as separate software programs, procedures, or modules, and thus various subsets of these programs or modules may be combined or otherwise re-arranged in various implementations. In some implementations, memory 214 stores a subset of the modules and data structures identified above. Furthermore, memory 214 may store additional modules and data structures not described above.

Figure 3:
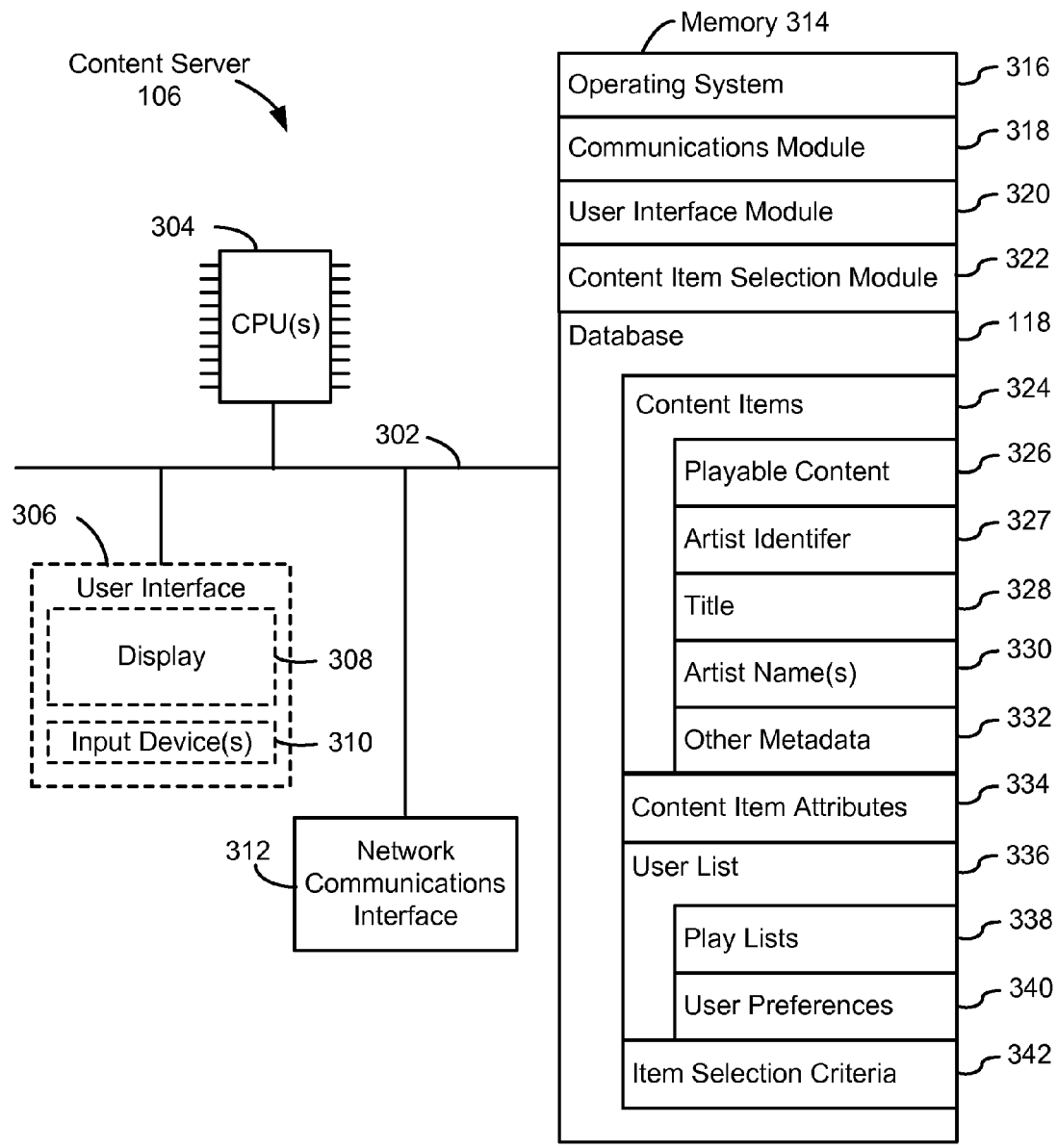
FIG. 3 is a block diagram illustrating a content server, in accordance with some implementations.

FIG. 3 is a block diagram illustrating a content server 106, according to some implementations. The content server 106 typically includes one or more processing units (CPUs, sometimes called processors or cores) 304 for executing programs (e.g., programs stored in memory 314), one or more network or other communications interfaces 312, an optional user interface 306, memory 314, and one or more communication buses 302 for interconnecting these components. The communication buses 302 may include circuitry (sometimes called a chipset) that interconnects and controls communications between system components. In some implementations, the user interface 306 includes a display 308 and input device(s) 310 (e.g., keyboard, mouse, touchscreen, keypads, etc.).

Memory 314 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 314 optionally includes one or more storage devices remotely located from the CPU(s) 304. Memory 314, or alternately the non-volatile memory devices(s) within memory 314, comprises a non-transitory computer readable storage medium. In some implementations, memory 314 or the computer readable storage medium of memory 314 stores the following programs, modules, and data structures, or a subset thereof:

- an operating system 316, which includes procedures for handling various basic system services and for performing hardware dependent tasks;
- a communications module 318, which connects the content server 106 to other computers (e.g., the client device 102, the web server 104, etc.) via the one or more communication interfaces 312 (wired or wireless) and one or more communication networks 108, such as the Internet, other wide area networks, local area networks, metropolitan area networks, and so on;
- an optional user interface module 320, which receives commands via the input device(s) 310 and generates user interface objects in the display device 308;
- a content item selection module 322, which selects content items 324 for individual users and/or for Internet radio stations based on one or more criteria; and
- a database 118, which stores content items 324 and other data used by the content item selection module 322 and other modules running on the content server 106.

Each content item 324 includes the playable content 326 (e.g., the actual audio track or video), as well as metadata about the content item 324. The metadata includes an artist identifier 327 uniquely identifying the real-world artist that produced or is otherwise associated with the content item, the title of the content item 328, the name(s) of the artists or group (e.g., singer, band, actor, movie producer, composer, conductor) 330, and other metadata 332 (e.g., genre, album title, International Standard Recording code ("ISRC"), etc.). In some implementations, the metadata includes metadata stored in an ID3 container associated with a content item.

In some implementations, content items 324 are audio tracks, videos, images, interactive games, three-dimensional environments, or animations.

The database 118 also includes feature vectors 344, which represent each artist identifier 327 in an n-dimensional vector space. The components of the feature vectors (i.e., the individual features included in the feature vectors) are discussed in herein.

The database 118 also includes a list of users 336, who are typically registered users. This allows the content server to track the likes and dislikes of the users, and thus present users with content items 324 that better match a user's likes. In some implementations, the database stores playlists 338 for each user, which are lists of content items 324. A playlist may be either completely constructed by the user or partially constructed by a user and filled in by the content item selection module 322 (e.g., by identifying items similar to or correlated with content items already in the playlist and/or otherwise selected by the user). An individual user may have zero or more playlists. Some implementations store user preferences 340 provided by each user. When provided, user preferences may enable the content item selection module 322 to provide better content item selections. The database also stores item selection criteria 342. In some implementations, the criteria are stored for each individual user. Some implementations enable multiple sets of selection criteria for an individual user (e.g., for a user who likes to listen to both jazz and classical music, but at different times). Some implementations support group selection criteria, which can be used independently or in conjunction with personal item selection criteria.

In some implementations, the programs or modules identified above correspond to sets of instructions for performing a function or method described herein. The sets of instructions can be executed by one or more processors or cores (e.g., the CPUs 304). The above identified modules or programs (i.e., sets of instructions) need not be implemented as separate software programs, procedures, or modules, and thus various subsets of these programs or modules may be combined or otherwise re-arranged in various implementations. In some implementations, memory 314 stores a subset of the modules and data structures identified above. Furthermore, memory 314 may store additional modules and data structures not described above.

Figure 4:
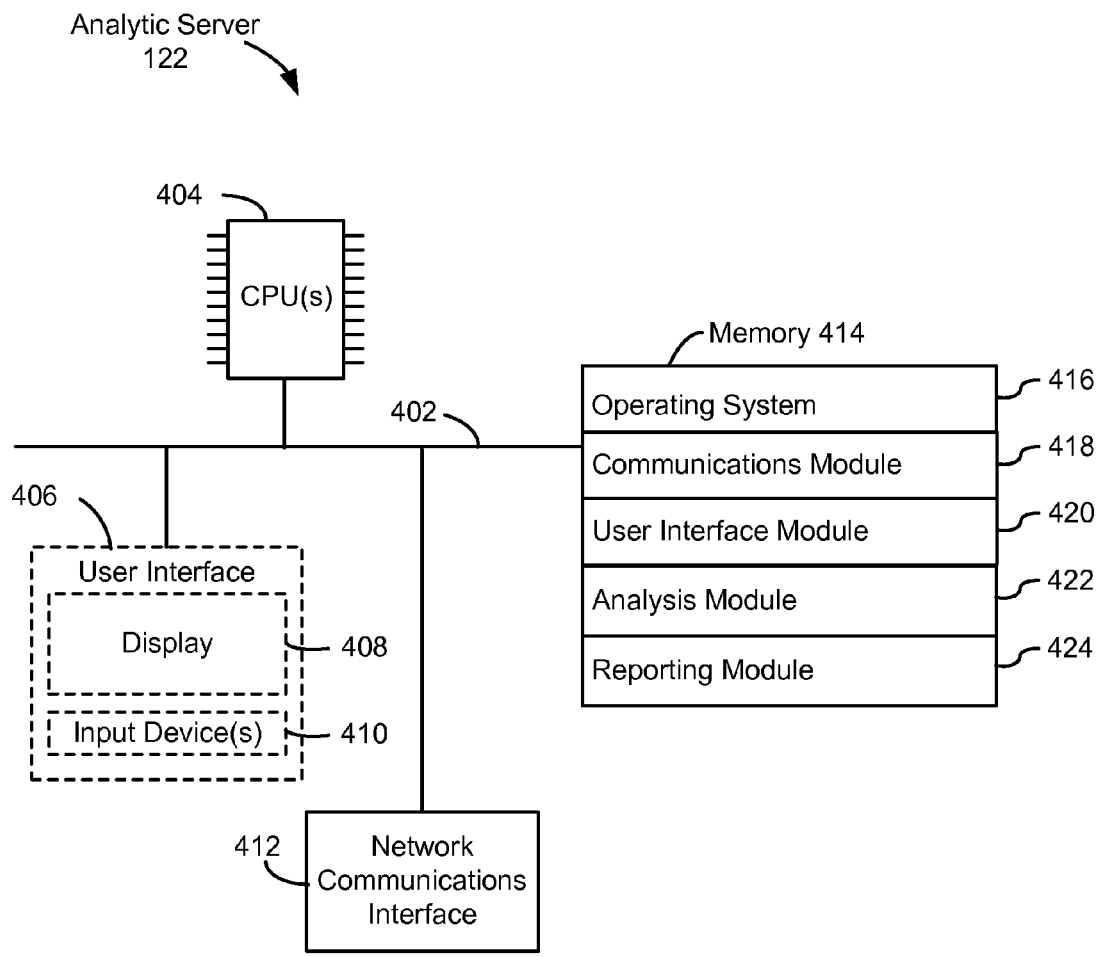
FIG. 4 is a block diagram illustrating an analytic server, in accordance with some implementations.

FIG. 4 is a block diagram illustrating an analytic server 122, according to some implementations. The analytic server 122 typically includes one or more processing units (CPUs, sometimes called processors or cores) 404 for executing programs (e.g., programs stored in memory 414), one or more network or other communications interfaces 412, an optional user interface 406, memory 414, and one or more communication buses 402 for interconnecting these components. The communication buses 402 may include circuitry (sometimes called a chipset) that interconnects and controls communications between system components. In some implementations, the user interface 406 includes a display 408 and input device(s) 410 (e.g., keyboard, mouse, touchscreen, keypads, etc.).

Memory 414 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 414 optionally includes one or more storage devices remotely located from the CPU(s) 404. Memory 414, or alternately the non-volatile memory devices(s) within memory 414, comprises a non-transitory computer readable storage medium. In some implementations, memory 414 or the computer readable storage medium of memory 414 stores the following programs, modules, and data structures, or a subset thereof:

- an operating system 416, which includes procedures for handling various basic system services and for performing hardware dependent tasks;
- a communications module 418, which connects the analytic server 122 to other computers (e.g., the content server 106, the metadata server 124, etc.) via the one or more communication interfaces 412 (wired or wireless) and one or more communication networks 108, such as the Internet, other wide area networks, local area networks, metropolitan area networks, and so on;
- an optional user interface module 420, which receives commands via the input device(s) 410 and generates user interface objects in the display device 408;
- an analysis module 422, which performs statistical analyses on the contents of the database 118 (including, e.g., artist identifiers, content items, metadata, etc.) to identify artist identifiers that are likely to be ambiguous (e.g., associated with media content from multiple real-world artists); and an optional reporting module 424, which produces reports identifying those artist identifiers that may be ambiguous, so that they can be reviewed and corrected (either automatically, e.g., by the analytic server 122, or manually by a human operator).

In some implementations, the programs or modules identified above correspond to sets of instructions for performing a function or method described herein. The sets of instructions can be executed by one or more processors or cores (e.g., the CPUs 404). The above identified modules or programs (i.e., sets of instructions) need not be implemented as separate software programs, procedures, or modules, and thus various subsets of these programs or modules may be combined or otherwise re-arranged in various implementations. In some implementations, memory 414 stores a subset of the modules and data structures identified above. Furthermore, memory 414 may store additional modules and data structures not described above.

Feature Vectors

As described above, the statistical classifiers used to identify potentially ambiguous artist identifiers operate on feature vectors. A feature vector is an n-dimensional vector associated with an artist identifier. They are populated with data that describes and/or is derived from content items or metadata of content items associated with the artist identifier. In particular, the components of a feature vector are values corresponding to particular features of the artist identifier, where the features provide some indication as to whether an artist identifier is ambiguous.

Feature vector components may be binary (e.g., having a value of 0 or 1), integers, decimals, etc. In some implementations, feature vectors are composed entirely of binary components. In some implementations, feature vectors are composed of a combination of binary and integer components.

An exemplary feature represented in a feature vector is whether an artist name associated with an artist identifier matches multiple artist entries in a supplemental metadata database (referred to herein as an "artist match" feature). For example, if the artist name "Prince" is associated with only one artist identifier in the database 118 of the content provider, but is associated with two (or more) different artist entries in a supplemental metadata database (e.g., metadata database 120), then the artist identifier of the content provider is likely to be ambiguous. In particular, because another source of metadata indicates that there is more than one artist with the same name, that is a reasonable indication that there are, in fact, multiple real-world artists with that name.

In some implementations, multiple instances of the artist match feature are used in a feature vector, where each instance corresponds to a different supplemental metadata database. By consulting multiple supplemental metadata databases, the likelihood of identifying ambiguous artist identifiers increases. For example, different databases may have metadata for different artists (or may have metadata of varying quality or completeness), so including artist match features derived from multiple databases will increase the likelihood that ambiguities will be detected. Moreover, any given metadata database may suffer from the same artist ambiguity problem as the primary database (e.g., the database 118 of the content provider 116). Thus, by including features derived from multiple databases, the likelihood of correctly identifying ambiguous artist identifiers increases.

In some implementations, the artist match feature is binary. For example, a value of 1 indicates that the artist name associated with an artist identifier matches multiple artist entries in a supplemental metadata database, and a value of 0 indicates that it does not.

In some implementations, the artist match feature is represented as an integer, where the integer represents the number of different artists in the supplemental metadata database that match the artist name associated with the artist identifier. This may increase the resolution of the feature vector, because an artist name that matches a greater number of artists in the supplemental database may be more likely to be ambiguous than one that matches fewer artists. For example, if an artist name from the service provider's database matches six artists in a supplemental metadata database, the probability that the artist name is ambiguous is greater than if it matched only two artists in that supplemental metadata database. The higher resolution offered by the integer representation of the artist match feature may result in more accurate identification of potentially ambiguous artist names.

Another exemplary feature is whether a number of countries of registration of media items associated with an artist identifier satisfies a predetermined condition (i.e., a "country count" feature). Specifically, artist identifiers that are associated with tracks registered in many different countries are more likely to be ambiguous than those with tracks registered in fewer countries. One possible reason for this is that artists may tend to register their recordings in their primary country of residence. Thus, when an artist identifier is associated with multiple different countries of registration, it may be more likely that the artist identifier is mistakenly associated with tracks from multiple artists.

In some implementations, the predetermined condition is whether the number of countries of registration exceeds a predetermined threshold. In some implementations, the country count feature is binary, and the value of the feature is 1 if the threshold is exceeded and 0 if the threshold is not exceeded. In some implementations, the predetermined threshold is 1, such that if a number of countries of registration associated with an artist identifier is two or more, the feature has a value of 1. In some implementations, the predetermined threshold is 2, 3, 4, 5, or any other appropriate number.

In some implementations, the country count feature is represented as an integer, where the integer represents the number of different countries of registration associated with the artist identifier. Accordingly, a greater integer value may indicate a higher likelihood that the artist identifier is ambiguous.

Another exemplary feature is whether a number of characters in an artist name associated with an artist identifier satisfies a predetermined condition (i.e., a "name length" feature). In some cases, this feature indicates artist ambiguity because shorter names are more likely to be shared by multiple artists than longer names. For example, the artist name "Yes" is more likely to be ambiguous than "Red Hot Chili Peppers."

In some implementations, the predetermined condition is whether the number of characters in the artist name exceeds a predetermined threshold. In some implementations, the name length feature is binary, and the value of the feature is 1 if the threshold is not exceeded and 0 if the threshold is exceeded. In some implementations, the threshold is 13 characters. In some implementations, the threshold is eight characters. In some implementations, the threshold is any appropriate integer representing a number of characters (e.g., between 0 and 100).

In some implementations, the name length feature is represented as an integer, where the integer represents the number of characters in the artist name associated with the artist identifier. In such cases, a greater integer value may indicate a lower likelihood that the artist identifier is ambiguous.

Another exemplary feature is whether the number of record labels associated with an artist identifier satisfies a predetermined condition (i.e., a "label count" feature). This feature can indicate artist ambiguity because artists are typically associated with relatively few record labels, and when multiple artists are mistakenly associated with one artist identifier, the number of record labels is higher than expected.

In some implementations, the predetermined condition is whether the number of record labels associated with the artist identifier exceeds a predetermined label threshold. In some implementations, the label count feature is binary, and the value of the feature is 1 if the threshold is exceeded and 0 if the threshold is not exceeded. In some implementations, the threshold is two labels. In some implementations, the threshold is three labels. In some implementations, the threshold is any appropriate integer representing a number of record labels (e.g., between 0 and 100).

In some implementations, the label count feature is represented as an integer, where the integer represents the number of record labels associated with the artist identifier. In such cases, a greater integer value may indicate a higher likelihood that the artist identifier is ambiguous.

Another exemplary feature is whether an artist identifier is associated with albums in at least two different languages (i.e., a "multilingual" feature). In some cases, this feature indicates artist ambiguity because artists tend to release all of their albums in a single language. Thus, if an artist identifier is associated with albums in two or more different languages, it is likely that the artist identifier is mistakenly associated with albums of multiple real-world artists.

In some implementations, languages of albums are determined based on the languages of the track titles associated with the album. For example, natural language processing techniques may be used to determine the language of the track titles.

In some implementations, the language of the album is determined by determining (e.g., using natural language processing) the language of each individual track in an album, and selecting as the language of the album the language associated with the most individual tracks. For example, if an album has eight tracks, and five of them are in English, the language of the album is determined to be English. As another example, if an album has eight tracks, and four are in English, two are in French, and two are in Spanish, the language of the album is determined to be English.

In some implementations, the language of the album is determined by combining the track names into a single text string and guessing (e.g., using natural language processing) the language of the text string as a whole. For example, all individual track titles are concatenated into a single text string (e.g., with each track title separated by a delimiter such as a period, comma, semicolon, space, etc.), and the language of this single text string is guessed using natural language processing techniques. The language of the album is then determined to be the language that was guessed for the concatenated text string.

Examples of natural language processing techniques for guessing languages of song titles are discussed in "A comparison of language identification approaches on short, query-style texts," by Thomas Gottron and Nedim Lipka, published in European Conference on Information Retrieval, 2010, which is hereby incorporated by reference in its entirety.

In some implementations, the multilingual feature is binary, and the value of the feature is 1 if the artist identifier is associated with albums in at least two languages and 0 if the artist identifier is not associated with album in at least two languages.

In some implementations, the multilingual feature is represented as an integer, where the integer represents the number of album languages associated with the artist identifier. In such cases, a greater integer value may indicate a higher likelihood that the artist identifier is ambiguous.

Another exemplary feature is whether the artist identifier is associated with media items having release dates that satisfy a predetermined condition (i.e., a "time span" feature). This feature can indicate ambiguity because artists identifiers that are associated with media content items released over a longer time period may be more likely to be ambiguous. Specifically, relatively few artists have long careers, so if an artist identifier is associated with media items that are released across multiple decades, for instance, that artist is more likely to be ambiguous than one that is associated with media items spanning a shorter time.

In some implementations, the predetermined condition is whether a difference between an earliest release date and a latest release date of media items associated with an artist identifier exceeds a predetermined threshold. In some implementations, the time span feature is binary, and the value of the feature is 1 if the threshold is exceeded and 0 if the threshold is not exceeded. In some implementations, the threshold is 20 years. In some implementations, the threshold is 10, 15, 25, 30, 35, or 50 years, or any appropriate number of years (e.g., between 0 and 100).

In some implementations, the time span feature is represented as an integer, where the integer represents the number of years between the earliest release date and the latest release date of media items associated with the artist identifier. In such cases, a greater integer value may indicate a higher likelihood that the artist identifier is ambiguous.

The particular parameters and/or thresholds of the features described above may be determined empirically, for example, by analyzing artist metadata from a training set including a set of artists known to be unambiguous and of a set of artists known to be ambiguous. By analyzing the training set, threshold values that best indicate artist ambiguity can be determined. For example, for a given training set, it may be determined that none of the ambiguous artists in a particular training set had artist names longer than 13 characters. Thus, as described above, the threshold for a name length feature may be set at 13 characters. Similar calculations are made for each feature that requires a threshold determination to in order to determine its value for a given artist identifier.

Furthermore, binary features are described above as having a value of 1 to indicate likely ambiguity and a value of 0 to indicate likely non-ambiguity, and the conditions are described such that a "true" outcome is indicative of ambiguity. However, different implementations may use different conventions. For example, in some implementations, values of 0 indicate likely ambiguity and values of 1 indicate likely non-ambiguity. Moreover, in some implementations, it is not necessary that each feature be calculated according to the same convention. Accordingly, within a single feature vector, a value of 1 can indicate likely ambiguity for some features, and likely non-ambiguity for other features. (Feature vectors should, however, be consistent across a dataset.)

FIG. 5A illustrates exemplary metadata 502 for an artist identifier, according to some implementations. In some implementations, the metadata 502 is stored in the database 118 of the content provider 116. In some implementations, the metadata is stored in the file container for the underlying media content (e.g., an ID3 container).

The metadata 502 includes an artist identifier 504. In this example, the artist identifier is the name "Prince," though it need not correspond to the name of the artist. For example, the artist identifier may be any unique identifier (e.g., any alphanumeric string).

The metadata 502 also includes items 506, 508, and 510, corresponding to content items (e.g., music tracks) that are associated with the artist identifier 504 in the database 118. As shown in FIG. 5B, items 506 and 508 correspond to songs by the U.S. pop artist Prince: "Raspberry Beret" and "Little Red Corvette." Item 510 corresponds to a song by the Caribbean artist named Prince: "Missing You."

Items 506, 508, and 510 each include metadata entries for artist name, title, country code, and record label. In some implementations, other metadata is included as well, such as album name, genre, track length, year, etc. (not shown).

FIG. 5B illustrates an example feature vector 512 for an artist identifier, according to some implementations. The feature vector 512 includes features $x_1$, $x_2$, $x_3$, $x_4$, and $x_5$, each corresponding to one of the features described above. As shown, the feature vector 512 includes the following features: artist match; country count; name length; label count; and multilingual.

FIG. 5B also illustrates the feature vector 512 populated with values derived from the metadata 502 in FIG. 5A, according to some implementations. In some implementations, the populated feature vector 513 is generated by a computer system (e.g., the analytic server 122) as part of a process for determining the probability that artist identifiers in a database (e.g., the database 118) are ambiguous.

The first component of feature vector 512 is an artist match feature. In this example, the artist match feature is binary, where a value of 1 indicates that the artist name associated with an artist identifier matches multiple artist entries in a supplemental metadata database, and a value of 0 indicates that it does not. In this example, the populated feature vector 513 includes a value of 1 for this feature, illustrating a case where the artist name "Prince" is found to be associated with more than one artist in a supplemental database, such as the metadata database 120, FIG. 1.

The next component of feature vector 512 is a country count feature. In this example, in some implementations, the country count feature is binary, where a value of 1 indicates that the number of countries of registration associated with an artist identifier is two or more. Because the metadata 502 indicates that the artist identifier Prince is associated with two different country codes ("US" for the United States and "JM" for Jamaica), the value of this feature is 1.

The next component of feature vector 512 is a name length feature. In this example, the name length feature is binary, where a value of 1 indicates that the length of the "artist name" is less than 13 characters. Because the metadata 502 illustrates that the artist name has only six characters, the value of this feature is 1.

The next component of feature vector 512 is a label count feature. In this example, the label count feature is binary, where a value of 1 indicates that the artist identifier is associated with more than two labels. Because the metadata 502 indicates three different record labels associated with the artist identifier, the value of this feature is 1.

Another component of feature vector 512 is a multilingual feature. In this example, the multilingual feature is binary, where a value of 1 indicates that the artist identifier is associated with albums in two or more languages. Because metadata 502 illustrates that all of the track names are in English (e.g., only 1 language), the value of this feature is 0.

In some implementations, feature vectors similar to feature vector 512 are created for each artist identifier in the database 118. The analytic server 122 then processes the feature vectors with a statistical classifier (such as a naïve Bayes or a logistic regression classifier) to determine the likelihood that each artist identifier is ambiguous.

In some implementations, different combinations of the features described above are used to populate feature vectors for each artist identifier in a dataset. The particular features in a feature vector may depend on the type of classifier that will operate on the feature vector. For example, in some implementations, feature vectors to be processed by a naïve Bayes classifier (discussed below) include an artist match feature, a name length feature, and a multilingual feature. In some implementations, the feature vectors for processing by the naïve Bayes classifier include multiple artist match features, each corresponding to a respective determination of whether the artist name matches multiple artist entries in a different respective supplemental database.

In some implementations, feature vectors to be processed by a logistic regression classifier (discussed below) include an artist match feature, a country count feature, a name length feature, and a multilingual feature. In some implementations, the feature vectors for processing by the logistic regression classifier include multiple artist match features, each corresponding to a determination of whether an artist name matches multiple artist entries in a different supplemental database.

In some implementations, feature vectors to be processed by the statistical classifiers include other combinations of the features, including any of those described above, or others not described.

Various statistical classifiers may be advantageously used to process feature vectors to calculate probabilities that artist identifiers are ambiguous. Two exemplary statistical classifiers are a naïve Bayes classifier and a logistic regression classifier.

In some implementations, a naïve Bayes classifier for determining artist ambiguity takes the form $$P(a \mid x) = \frac{P(a) * P(x \mid a)}{P(x)} \qquad \text{Equation (A)}$$

where a is an artist identifier;

x is a feature vector;

P(a) is the probability that the artist identifier a is associated with media items from two or more different real world artists;

P(x) is the probability that an artist identifier has a particular feature vector x;

P(x|a) is the probability that the feature vector x is observed for an artist identifier a given that it is known the artist identifier a is associated with media items from two or more different real world artists; and P(a|x) is the probability that the artist identifier a is associated with media items from two or more different real world artists given that the feature vector x is observed.

In some implementations, a logistic regression classifier for determining artist ambiguity takes the form $$P(a \mid x) = \frac{e^{\sum_{i=1}^{n} \beta_i x_i + \beta_0}}{1 + e^{\sum_{i=1}^{n} \beta_i x_i + \beta_0}} \quad \text{Equation (B)}$$

where
a is an artist identifier;
x is a feature vector of the form $(x_1, x_2, \ldots, x_n)$;
$\beta_0$ and $\beta_1$ are constants; and
P(a|x) is the probability that the artist identifier a is associated with media items from two or more different real world artists given that the feature vector x is observed.

In some implementations, an analytic server (e.g., the analytic server 122) processes feature vectors of artist identifiers using one or both of the classifiers to estimate the probability that the artist identifiers are ambiguous. Methods for estimating probabilities using statistical classifiers are described below with respect to FIGS. 6A-6B.

Figure 6A:
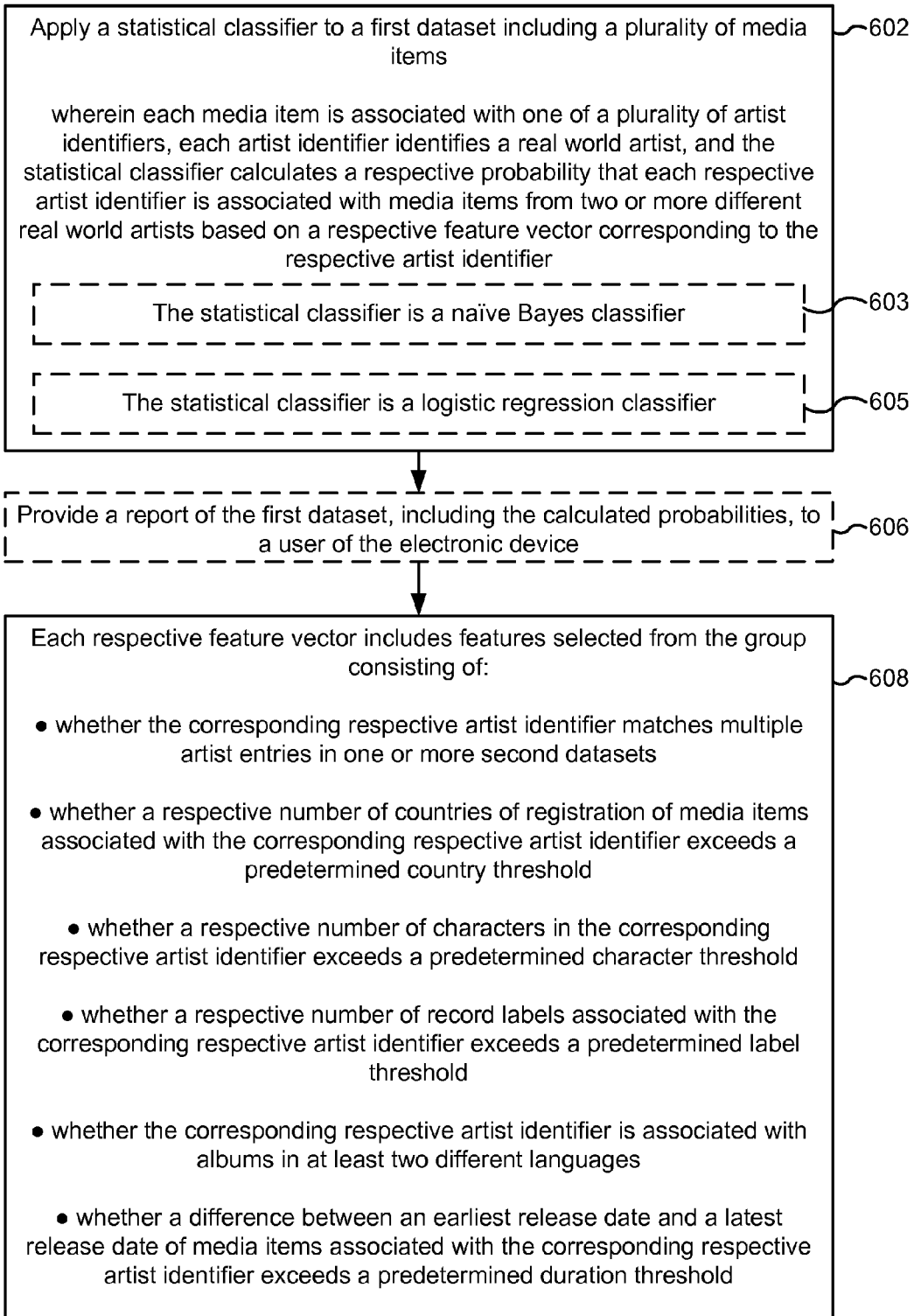
FIGS. 6A-6B are flow diagrams illustrating a method of estimating artist ambiguity in a dataset, in accordance with some implementations.
Figure 6B:
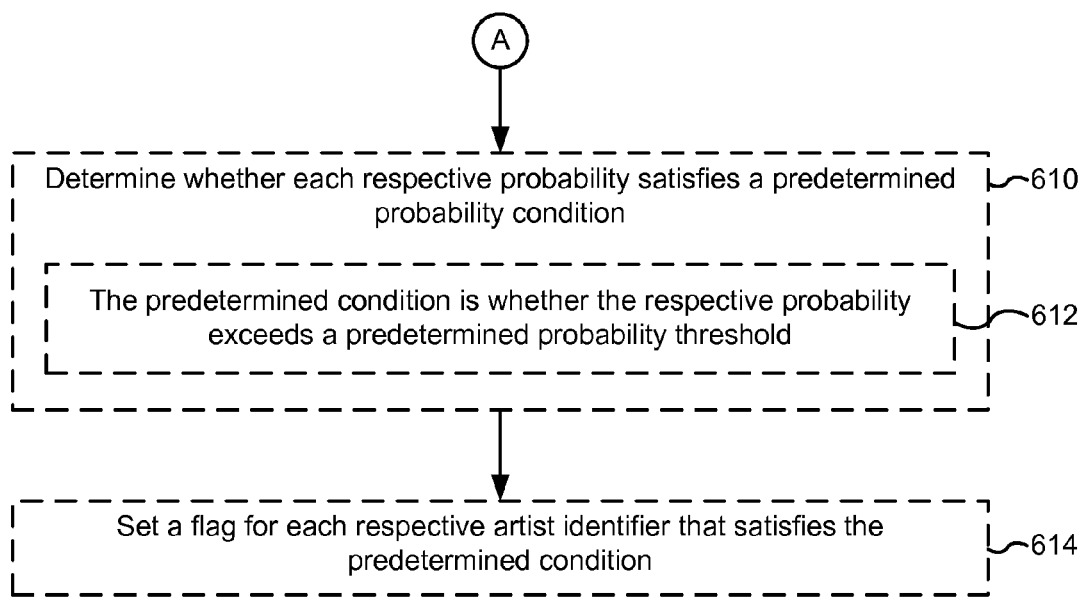

FIGS. 6A-6B are a flow diagrams of an exemplary method 600 for estimating artist ambiguity in a dataset, in accordance with some implementations. In some implementations, the method 600 is performed at an electronic device with one or more processors or cores and memory storing one or more programs for execution by the one or more processors. For example, in some implementations, the method 600 is performed at the analytic server 122 of the content provider. While the method is described herein as being performed by the analytic server 122, the method may be performed by other devices in addition to or instead of the analytic server 122, including, for example, the content server 106 or the client device 102. The individual steps of the method may be distributed among the one or more computers, systems, or devices in any appropriate manner.

The analytic server applies a statistical classifier to a first dataset (e.g., the database 118) including a plurality of media items (602). Each media item in the dataset is associated with one of a plurality of artist identifiers, and each artist identifier identifies a real world artist. As noted above, an artist identifier is any identifier (e.g., text, words, numbers, etc.) that uniquely identifies a single real-world artist within the dataset. A real-world artist is an entity (e.g., band, person, group, etc.) that created and/or recorded the particular media item.

In some implementations, media items are music tracks. In some implementations, media items are movies, videos, pictures, podcasts, audio books, television shows, spoken-word recordings, etc.

The statistical classifier applied in step (602) calculates a respective probability that each respective artist identifier is associated with media items from two or more different real-world artists, based on a respective feature vector corresponding to the respective artist identifier (i.e., the probability that the respective artist identifier is ambiguous).

In some implementations, the probability that a respective artist identifier is ambiguous is represented as a probability estimate having a value within a range of possible values, where the value specifies how ambiguous the artist identifier is. For example, in some cases, the probability estimate is represented as a value y, where $0 \geq y \geq 1$. In some implementations, a value of 1 indicates the highest probability that the artist is ambiguous, and 0 represents the lowest probability that the artist is ambiguous. Other scales and/or ranges may be used in various implementations. For example, the probability estimate may be represented as a value between 0 and 100, 1 and 10, −1 and +1, or any other appropriate range.

In some implementations, the probability that a respective artist identifier is ambiguous is represented as a binary result: the result of the classifier (and/or a program applying the classifier) indicates that artist identifier is likely ambiguous (e.g., corresponding to a value of 1 or "true"), or that it is not likely ambiguous (e.g., corresponding to a value of 0 or "false"). Where the statistical classifier produces probability values within a range, as described above, a binary result is calculated by determining whether the value satisfies a particular threshold value. In some implementations, the threshold is set at 50% of the range of possible values (e.g., a value of 0.5 in implementations where probability estimates range from 0 to 1). In some implementations, other threshold values are used, such as 40%, 75%, 80%, 100%, or any other percentage of the range of probability values.

Returning to FIG. 6A, in some implementations, the statistical classifier is a naïve Bayes classifier (603). In some implementations, the naïve Bayes classifier takes the form of Equation A, as described above.

In some implementations, the statistical classifier is a logistic regression classifier (605). In some implementations, the logistic regression classifier takes the form of Equation B, as described above.

In some implementations, the analytic server provides a report of the first dataset, including the calculated probabilities, to a user of the electronic device (606). The report indicates what artist identifiers are likely ambiguous. A human operator may then review the potentially ambiguous artist identifiers to correct any ambiguities (e.g., by creating an additional artist identifier for media items that are mistakenly associated with a particular artist identifier).

Each respective feature vector includes features selected from the group consisting of (608): whether the corresponding respective artist identifier matches multiple artist entries in one or more second datasets (e.g., an "artist match" feature, described above); whether a respective number of countries of registration of media items associated with the corresponding respective artist identifier exceeds a predetermined country threshold (e.g., a "country count" feature, described above); whether a respective number of characters in the corresponding respective artist identifier exceeds a predetermined character threshold (e.g., a "name length" feature, described above); whether a respective number of record labels associated with the corresponding respective artist identifier exceeds a predetermined label threshold (e.g., a "label count" feature, described above); whether the corresponding respective artist identifier is associated with albums in at least two different languages (e.g., a "multilingual" feature, described above); and whether a difference between the earliest release date and the latest release date of media items associated with the corresponding respective artist identifier exceeds a predetermined duration threshold.

In some implementations where the statistical classifier is a naïve Bayes classifier, the feature vector includes the following features: an "artist match" feature, a "name length" feature, and a "multilingual" feature.

In some implementations where the statistical classifier is a logistic regression classifier, the feature vector includes the following features: an "artist match" feature, a "country count" feature, a "name length" feature, and a "multilingual" feature.

Turning to FIG. 6B, in some implementations, the analytic server determines whether each respective probability satisfies a predetermined probability condition (610).

In some implementations, the predetermined probability condition is whether the respective probability exceeds a predetermined probability threshold (612). The threshold is any appropriate value, and depends, at least in part, on the range of probability values produced by the statistical classifier. In some implementations, the threshold is 0.5, 0.8, 0.9, or any other appropriate value.

Thereafter, the analytic server sets a flag for each respective artist identifier that satisfies the predetermined probability condition (614). Accordingly, the dataset can be sorted and/or filtered using the flags to identify and/or display artist identifiers that are likely ambiguous. A human operator can then review the potentially ambiguous artist identifiers and take appropriate actions to correct any errors. For example, a human operator may create a new artist identifier, disassociate media items from an incorrect artist identifier, and associate the media items with the new artist identifier.

Some or all of these tasks may be automated so that they do not need to be manually performed by a human operator. For example, a human operator may simply identify those media items that are associated with the wrong artist identifier, and instruct the analytic server 122 (or any other appropriate computer system or device) to perform a disambiguating routine that creates a new artist identifier, associates the identified media items with the new artist identifier, and disassociates the identified media items from the incorrect artist identifier.

In some implementations, the analytic server determines whether the respective probabilities of the respective artist identifiers satisfy a predetermined probability condition. For example, if the probabilities are represented in binary form, the condition may be that the probability is equal to 1 (e.g., indicating that the artist identifier is likely ambiguous). If the probabilities are represented as probability estimates having values within a range of possible values (e.g., $0 \geq y \geq 1$), the condition may be that the probability estimate meets or exceeds a predetermined probability threshold. In some implementations, the threshold is 0.5, 0.6, 0.9, or any other appropriate value.

In response to detecting that a particular probability of a particular artist identifier satisfies the predetermined probability condition, the analytic server creates a new artist identifier and associates one or more particular media items with the new artist identifier, where the one or more particular media items were previously associated with the particular artist identifier. For example, the analytic server identifies a group of media items that are mistakenly associated with the particular artist identifier, and associates that group of media items with a newly created artist identifier.

In some implementations, prior to creating the new artist identifier, the analytic server identifies the one or more media items that are to be associated with the new artist identifier by consulting a second dataset (e.g., the metadata database 120) to determine which media items should be associated with which artist identifiers.

For example, the analytic server can identify, in the second dataset, all of the media items that are associated with the likely ambiguous artist identifier in the first dataset. The analytic server can then determine which media items should be grouped together under different artist identifiers. Specifically, in some implementations, the analytic server (or a third-party server associated with the second dataset) identifies a first artist entry in the second dataset that is associated with the one or more media items and has a same artist name as the particular artist identifier, and identifies a second artist entry in the second dataset that is not associated with the one or more media items and has the same name as the particular artist identifier.

In some implementations, the features for the feature vector used in any of the implementations described herein are selected from a different set of features than are described in step (608). For example, instead of being represented as binary values (e.g., whether or not a particular feature satisfies a predetermined threshold), at least a subset of the features are represented as integer values. Specifically, in some implementations, each respective feature vector includes features selected from the group consisting of: whether the corresponding respective artist identifier matches multiple artist entries in one or more second datasets; a respective number of countries of registration of media items associated with the corresponding respective artist identifier (e.g., an "country count" feature represented as an integer value); a respective number of characters in the corresponding respective artist identifier (e.g., an "artist name" feature represented as an integer value); a respective number of record labels associated with the corresponding respective artist identifier (e.g., an "label count" feature represented as an integer value); a respective number of languages of albums associated with the corresponding respective artist identifier (e.g., a "multilingual" feature represented as an integer value); and a respective number of years between the earliest release date and the latest release date of media items associated with the corresponding respective artist identifier (e.g., a "time span" feature represented as an integer value).

In some implementations, the features for the feature vector are selected from any combination of features described herein, including those represented as binary values and those represented as integer values.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

It will also be understood that, although the terms "first," "second," etc. may be used herein to describe various elements, these elements should not be limited by these terms. These terms are only used to distinguish one element from another. For example, a first server could be termed a second server, and, similarly, a second server could be termed a first server, without changing the meaning of the description, so long as all occurrences of the "first server" are renamed consistently and all occurrences of the "second server" are renamed consistently.

Further, the terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Finally, as used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

What is claimed is:

1. A method for estimating artist ambiguity in a dataset, comprising:
    at an electronic device having one or more processors and memory storing one or more programs for execution by the one or more processors:
        applying a statistical classifier to a first dataset including a plurality of media items, wherein each media item is associated with a respective artist identifier of a plurality of artist identifiers, each respective artist identifier identifies a real world artist, and the statistical classifier calculates a respective probability that each respective artist identifier is associated with media items from two or more different real world artists based on a respective feature vector corresponding to each respective artist identifier; and
        providing a report of the first dataset, including the calculated probabilities, to a user of the electronic device;
    wherein each respective feature vector includes features selected from the group consisting of:
        whether the corresponding respective artist identifier matches multiple artist entries in one or more second datasets;
        whether a respective number of countries of registration of media items associated with the corresponding respective artist identifier exceeds a predetermined country threshold;
        whether a respective number of characters in the corresponding respective artist identifier exceeds a predetermined character threshold;
        whether a respective number of record labels associated with the corresponding respective artist identifier exceeds a predetermined label threshold;
        whether the corresponding respective artist identifier is associated with albums in at least two different languages; and
        whether a difference between an earliest release date and a latest release date of media items associated with the corresponding respective artist identifier exceeds a predetermined time span threshold.

2. The method of claim 1, wherein the statistical classifier is a naïve Bayes classifier.

3. The method of claim 2, wherein the naïve Bayes classifier takes the form $$P(a \mid x) = \frac{P(a) * P(x \mid a)}{P(x)}$$

wherein:
    a is an artist identifier;
    x is a feature vector
    P(a) is the probability that the artist identifier a is associated with media items from two or more different real world artists;
    P(x) is the probability that an artist identifier has a particular feature vector x;
    P(x|a) is the probability that the feature vector x is observed for an artist identifier a given that it is known the artist identifier a is associated with media items from two or more different real world artists; and
    P(a|x) is the probability that the artist identifier a is associated with media items from two or more different real world artists given that the feature vector x is observed.

4. The method of claim 3, wherein the feature vector includes the following features:
    whether the corresponding respective artist identifier matches multiple artist entries in one or more second datasets;
    whether a respective number of characters in the corresponding respective artist identifier exceeds a predetermined character threshold; and
    whether the corresponding respective artist identifier is associated with albums in at least two different languages.

5. The method of claim 1, wherein the statistical classifier is a logistic regression classifier.

6. The method of claim 5, wherein the logistic regression classifier takes the form $$P(a \mid x) = \frac{e^{\sum_{i=1}^{n} \beta_i x_i + \beta_0}}{1 + e^{\sum_{i=1}^{n} \beta_i x_i + \beta_0}}$$

wherein:
    a is an artist identifier;
    x is a feature vector of the form $(x_1, x_2, \ldots, x_n)$;
    $\beta_0$ and $\beta_1$ are constants; and
    P(a|x) is the probability that the artist identifier a is associated with media items from two or more different real world artists given that the feature vector x is observed.

7. The method of claim 6, wherein the feature vector includes the following features:
    whether the corresponding respective artist identifier matches multiple artist entries in one or more second datasets;
    whether a respective number of countries of registration of media items associated with the corresponding respective artist identifier exceeds a predetermined country threshold;
    whether a respective number of characters in the corresponding respective artist identifier exceeds a predetermined character threshold; and
    whether the corresponding respective artist identifier is associated with albums in at least two different languages.

8. The method of claim 1, further comprising:
determining whether each respective probability satisfies a predetermined probability condition; and
setting a flag for each respective artist identifier that is associated with a respective probability that satisfies the predetermined probability condition.

9. The method of claim 8, wherein the predetermined probability condition is whether the respective probability exceeds a predetermined probability threshold.

10. The method of claim 9, wherein the probability threshold is 0.5.

11. The method of claim 9, wherein the probability threshold is 0.9.

12. The method of claim 1, wherein:
each respective feature vector includes the feature of whether the respective number of countries of registration of media items associated with the corresponding respective artist identifier exceeds the predetermined country threshold; and
the predetermined country threshold is 1 country.

13. The method of claim 1, wherein:
each respective feature vector includes the feature of whether the respective number of characters in the corresponding respective artist identifier exceeds the predetermined character threshold; and
the predetermined character threshold is 13 characters.

14. The method of claim 1, wherein:
each respective feature vector includes the feature of whether the respective number of record labels associated with the corresponding respective artist identifier exceeds the predetermined label threshold; and
the predetermined label threshold is 3 record labels.

15. A method for estimating artist ambiguity in a dataset, comprising:
at an electronic device having one or more processors and memory storing one or more programs for execution by the one or more processors:
applying a statistical classifier to a first dataset including a plurality of media items, wherein each media item is associated with a respective artist identifier of a plurality of artist identifiers, each respective artist identifier identifies a real world artist, and the statistical classifier calculates a respective probability that each respective artist identifier is associated with media items from two or more different real world artists based on a respective feature vector corresponding to each respective artist identifier; and
providing a report of the first dataset, including the calculated respective probabilities, to a user of the electronic device;
wherein each respective feature vector includes features selected from the group consisting of:
whether the corresponding respective artist identifier matches multiple artist entries in one or more second datasets;
a respective number of countries of registration of media items associated with the corresponding respective artist identifier;
a respective number of characters in the corresponding respective artist identifier;
a respective number of record labels associated with the corresponding respective artist identifier;
a respective number of languages of albums associated with the corresponding respective artist identifier; and
a respective difference between an earliest release date and a latest release date of media items associated with the corresponding respective artist identifier.

16. A method for estimating artist ambiguity in a dataset, comprising:
at an electronic device having one or more processors and memory storing one or more programs for execution by the one or more processors:
applying a statistical classifier to a first dataset including a plurality of media items, wherein each media item is associated with a respective artist identifier of a plurality of artist identifiers, each respective artist identifier identifies a real world artist, and the statistical classifier calculates a respective probability that each respective artist identifier is associated with media items from two or more different real world artists based on a respective feature vector corresponding to each respective artist identifier.

17. The method of claim 16, wherein each respective feature vector includes features selected from the group consisting of:
whether the corresponding respective artist identifier matches multiple artist entries in one or more second datasets;
whether a respective number of countries of registration of media items associated with the corresponding respective artist identifier exceeds a predetermined country threshold;
whether a respective number of characters in the corresponding respective artist identifier exceeds a predetermined character threshold;
whether a respective number of record labels associated with the corresponding respective artist identifier exceeds a predetermined label threshold;
whether the corresponding respective artist identifier is associated with albums in at least two different languages; and
whether a difference between an earliest release date and a latest release date of media items associated with the corresponding respective artist identifier exceeds a predetermined time span threshold.

18. The method of claim 17, further comprising providing a report of the first dataset, including the calculated probabilities, to a user of the electronic device.

19. The method of claim 17, further comprising:
determining whether the respective probabilities of the respective artist identifiers satisfy a predetermined probability condition; and
in response to detecting that a particular probability of a particular artist identifier satisfies the predetermined probability condition:
creating a new artist identifier; and
associating one or more particular media items with the new artist identifier, wherein the one or more particular media items were previously associated with the particular artist identifier.

20. The method of claim 19, further comprising, prior to creating the new artist identifier, identifying the one or more media items in a second dataset by identifying a first artist entry in the second dataset that is associated with the one or more media items and has a same artist name as the particular artist identifier, and identifying a second artist entry in the second dataset that is not associated with the one or more media items and has the same name as the particular artist identifier.

21. A computer system, comprising:
one or more processors; and
memory storing one or more programs for execution by the one or more processors, the one or more programs including instructions for:

applying a statistical classifier to a first dataset including a plurality of media items, wherein each media item is associated with a respective artist identifier of a plurality of artist identifiers, each respective artist identifier identifies a real world artist, and the statistical classifier calculates a respective probability that each respective artist identifier is associated with media items from two or more different real world artists based on a respective feature vector corresponding to each respective artist identifier; and providing a report of the first dataset, including the calculated probabilities, to a user of the electronic device;

wherein each respective feature vector includes features selected from the group consisting of:

whether the corresponding respective artist identifier matches multiple artist entries in one or more second datasets;

whether a respective number of countries of registration of media items associated with the corresponding respective artist identifier exceeds a predetermined country threshold;

whether a respective number of characters in the corresponding respective artist identifier exceeds a predetermined character threshold;

whether a respective number of record labels associated with the corresponding respective artist identifier exceeds a predetermined label threshold;

whether the corresponding respective artist identifier is associated with albums in at least two different languages; and whether a difference between an earliest release date and a latest release date of media items associated with the corresponding respective artist identifier exceeds a predetermined time span threshold.

22. A non-transitory computer readable storage medium storing one or more programs, the one or more programs comprising instructions, which, when executed by a portable electronic device or a computer system with one or more processors, cause the device or system to:

apply a statistical classifier to a first dataset including a plurality of media items, wherein each media item is associated with a respective artist identifier of a plurality of artist identifiers, each respective artist identifier identifies a real world artist, and the statistical classifier calculates a respective probability that each respective artist identifier is associated with media items from two or more different real world artists based on a respective feature vector corresponding to each respective artist identifier; and provide a report of the first dataset, including the calculated probabilities, to a user of the electronic device;

wherein each respective feature vector includes features selected from the group consisting of:

whether the corresponding respective artist identifier matches multiple artist entries in one or more second datasets;

whether a respective number of countries of registration of media items associated with the corresponding respective artist identifier exceeds a predetermined country threshold;

whether a respective number of characters in the corresponding respective artist identifier exceeds a predetermined character threshold;

whether a respective number of record labels associated with the corresponding respective artist identifier exceeds a predetermined label threshold;

whether the corresponding respective artist identifier is associated with albums in at least two different languages; and whether a difference between an earliest release date and a latest release date of media items associated with the corresponding respective artist identifier exceeds a predetermined time span threshold.

\* \* \* \* \*